United States Patent [19]
Lemke et al.

[11] Patent Number: 5,193,046
[45] Date of Patent: Mar. 9, 1993

[54] INFORMATION RECORDING APPARATUS WITH A LIQUID BEARING

[75] Inventors: James U. Lemke, San Diego; William W. French, Encinitas; William B. McHargue, La Jolla, all of Calif.

[73] Assignee: Conner Peripherals, nc., San Jose, Calif.

[21] Appl. No.: 590,608

[22] Filed: Sep. 25, 1990

Related U.S. Application Data

[63] Continuation of Ser. No. 259,344, Oct. 17, 1988, abandoned.

[51] Int. Cl.$^5$ .................. G11B 33/14; G11B 5/60; G11B 15/64; G11B 17/32
[52] U.S. Cl. .................. 360/97.02; 360/102
[58] Field of Search .................. 360/97.02, 102, 103

[56] References Cited

U.S. PATENT DOCUMENTS

| | | | |
|---|---|---|---|
| 3,005,675 | 10/1961 | Ledin et al. | |
| 3,177,493 | 4/1965 | Durlofsky | 346/74 |
| 3,907,079 | 9/1975 | Chapman | 188/290 |
| 4,366,519 | 12/1982 | Maruyama | 360/129 |
| 4,626,941 | 12/1986 | Sawada et al. | 360/103 X |
| 4,633,351 | 12/1986 | Bardos et al. | 360/102 |
| 4,757,402 | 7/1988 | Mo | 360/103 |
| 4,789,913 | 12/1988 | Gregory et al. | 360/97.02 X |
| 4,901,185 | 2/1990 | Kubo et al. | 360/104 |
| 4,931,338 | 6/1990 | Toffle | 428/65 |

FOREIGN PATENT DOCUMENTS

| | | | |
|---|---|---|---|
| 1221164 | 4/1987 | Canada . | |
| 1239354 | 4/1967 | Fed. Rep. of Germany . | |
| 57-40753 | 3/1982 | Japan | 360/131 B |
| 63-136384 | 6/1988 | Japan | 360/97.02 |

OTHER PUBLICATIONS

IBM/TDB vol. 9 No. 7 Dec. 1966 p. 779, "Lubricants for Magnetic Recording Media" by Friedman et al.
Doppler Interferometry on Magnetic Recording Systems (Invited) D. B. Bogy et al ISSN 0340-8639-The Establishment of Standard Reference Surfaces for Rigid Magnetic Disks with High Recording Density-Oct. 1982-Jurgen Hartmann.
Characterization of Lubricant/Solid Interfaces by FTIR by R. S. Timsit, G. Stratford and M. Fairlie, Alcan International Limited, pp. 98-104 of "Tribology and Mechanics of Magnetic Storage Systems" Society of Tribologists and Lubrication Engineers, 1987 conference proceedings.
IBM Technical Disclosure Bulletin, vol. 28, No. 2 Jul. 1985 Lubricant-Stabilizing Structure for Magnetic Disks.
I Brake for Whales by Whyte Audio, Jul. 1990.
InfoCorp Publication (Sep. 30, 1988).
Here Comes the First 2.5-In. Winchester Drive Oct. 1988 Electronics article.
A New 2½ Inch Thin Film Disk (Oct. 1988) Solid State Technology article.
3½-Inch High-Performance Winchester Disk Drives for Laptop Computers, Conner Peripherals article.
Peripherals article by Gary Stix.
Magnetic Recording article, vol. II, C. D. Mee, et al. copyright 1988.

*Primary Examiner*—John H. Wolff
*Attorney, Agent, or Firm*—Fliesler, Dubb, Meyer & Lovejoy

[57] ABSTRACT

An information storage apparatus is disclosed for reading and/or writing information on a rigid storage medium which includes a liquid bearing interface between the transducer and medium instead of a conventional air bearing. The liquid is a fluorocarbon which has stable, self-lubricating, viscous and high-density properties. In an exemplary embodiment of a cockpit voice recorder/flight data recorder, low-density metallic components or composite parts of the rigid magnetic disk drive assembly with essentially the same density as the liquid achieve a near zero buoyancy configuration that obviates the effects of vibration and acceleration.

24 Claims, 7 Drawing Sheets

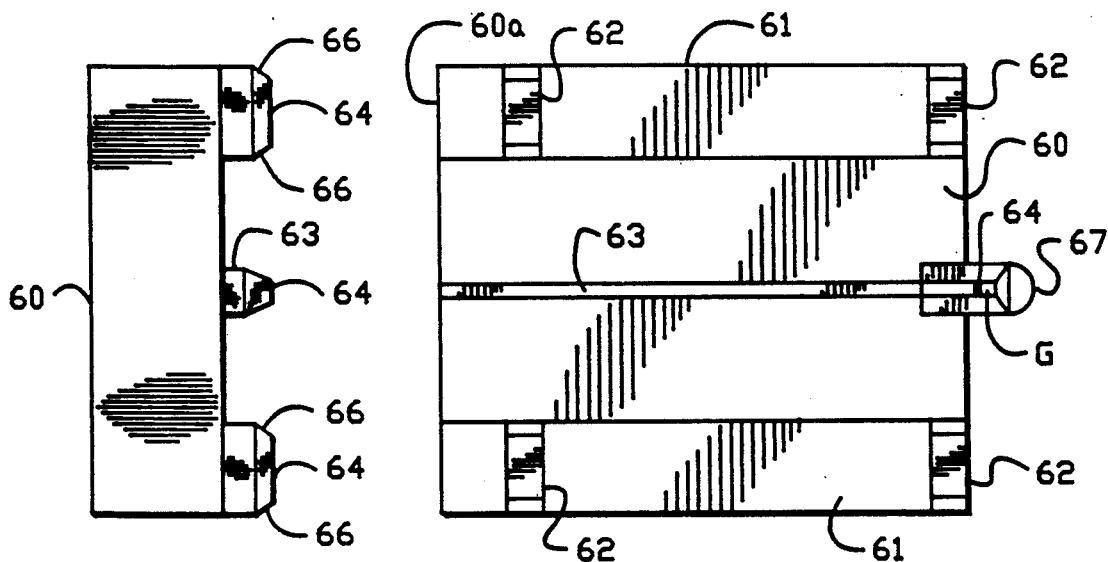
FIG.—5A   FIG.—5B
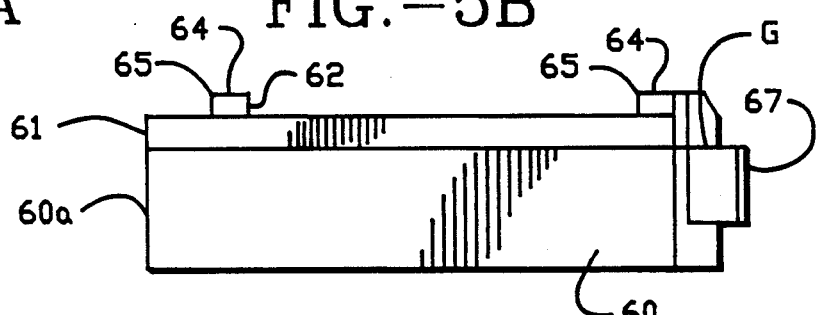
FIG.—5C
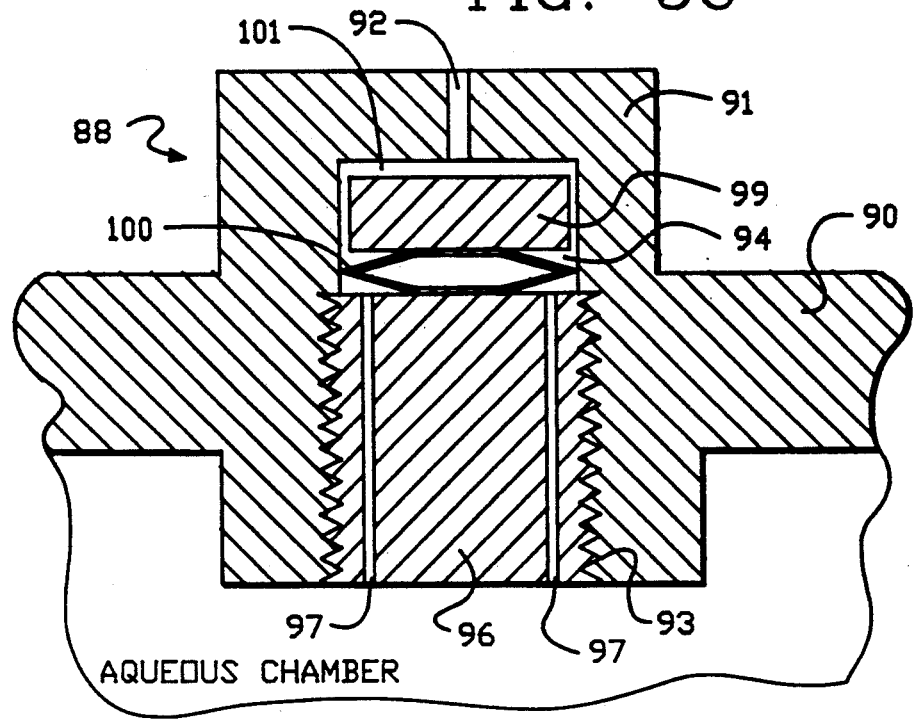
FIG.—11

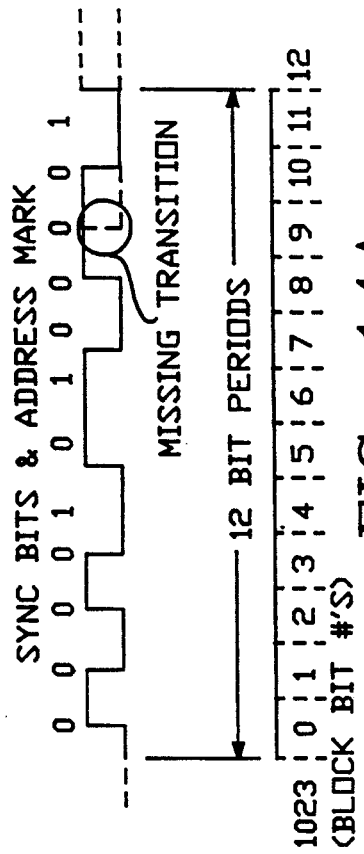
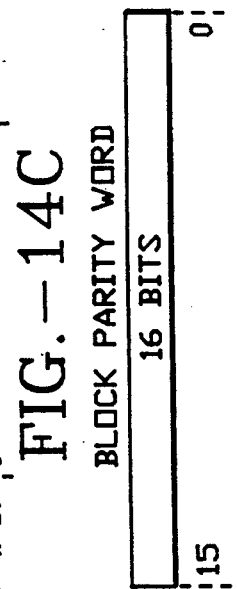
FIG.-13
FIG.-14A
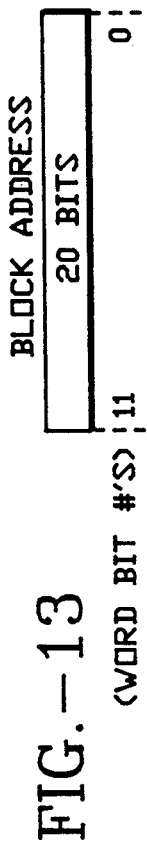
FIG.-14B
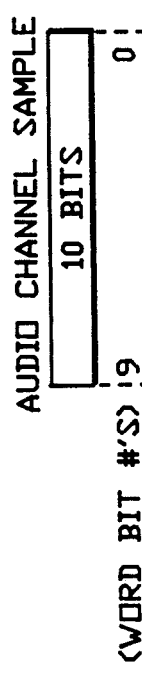
FIG.-14C
FIG.-14D

INFORMATION RECORDING APPARATUS WITH A LIQUID BEARING

This is a continuation of application Ser. No. 07/259,344 filed Oct. 17, 1988 now abandoned.

BACKGROUND OF THE INVENTION

1. Field of the Invention

The present invention relates to information recording systems. More specifically, the present invention relates to a recording system having a novel liquid bearing interface between a transducer and a storage medium that provides improved reliability and performance over the currently-used air bearing. The invention applies particularly to information recording systems which use a disk for information storage and an air-borne transducer head for placing information on, and retrieving information from, the disk.

2. Background of the Art

The tribology of magnetic recording systems presents challenges well-known in the art. Although continual contact between the transducer (typically a read/write head mounted on a slider) and the magnetic medium is advantageous from a magnetics perspective, such arrangement is undesirable because wear and materials interactions lead to degraded system reliability and performance. Accordingly, one paramount consideration in designing magnetic recording systems is the spacing between the head and medium.

The read/write head in a conventional recording system does not touch the rigid magnetic disk during sustained normal operation. Instead, it "flies" at a certain height (the "flying height") on a thin cushion of air carried along by the rapidly spinning disk. Typical flying heights are on the order of 12 microinches above the disk's surface.

The function of this cushion of air is analagous to that of a bearing, in that it corresponds to a machine part on which another part (the head) moves or slides with respect to the disk. In this regard, the air cushion supports the head in its position off of the disk.

Of course, a number of recording technologies do permit physical contact between head and storage medium during operation. Such technologies typically employ a flexible storage medium and are represented by tape and floppy disk recording systems. In these technologies, the concept and requirements of "flying height", and considerations relating to a bearing which functions to maintain flying height, are absent. This invention is not intended for use in such systems. Instead, this invention finds its dominant use in recording technologies in which a rigid, recording medium is moved (usually, rotated) with respect to a transducer, which must be maintained at a position off of ("above") the moving medium during system operation.

In the description following, the moving medium is assumed to be a rigid, rotating magnetic disk, usually referred to as a "hard" or "Winchester" disk. However, the description of the embodiment is not intended to limit the scope of application of the invention, which could also apply, for example, to a spinning drum or, to a head in motion with respect to a stationary medium.

The disks in typical rigid-disk recording systems are commonly, but not always, coated with a relatively thin layer of lubricant, typically less than one microinch thick, to protect the head and disk surfaces during those occasional times when these surfaces touch, such as when the drive is jarred, or when the head passes over an asperity on the disk, or during take off and landing of the head. As is well known in the art, such lubrication is achieved by topical application. The lubricating function performed by the applied substance in the prior art is limited to the reduction of friction and wear on the head and disk.

The lubricating layer is kept viscous and thin. If a relatively non-viscous lubricant were used, it would tend to migrate to the edge of the disk in response to the centrifugal forces generated by the spinning disk. The layer is thin because the conventional air bearing sets the distance (the flying height) between the head and the surface adjacent to it, which is the top surface of the lubricant. If the lubricant is made thicker, then the head will be spaced further from the medium, which will degrade the performance of the system, as is well known in the art.

There are several problems associated with conventional air bearings. First; air is relatively compressible. A small acceleration (as small as 40 g's) can exert a force on a head in a typical system great enough to cause the head to strike the disk, which, in spite of the presence of a lubricant, can lead to complete failure of the system. Such accelerations are easily caused by shocks and vibrations commonly encountered in the environment in which magnetic recording systems are employed. Second; when the distance from the head to the disk becomes comparable to the mean free path of air molecules, about three microinches, the air bearing becomes unstable and unreliable. As modern systems begin to approach this spacing limit, these instabilities in flying height can cause catastrophic contact between head and disk, and make it difficult for the system designer to know what record current to use when recording and what signal level to expect when reading information from the disk.

Present recording systems based upon use of a rigid disk experience the above-described shortcomings. Storage of information at even higher densities will require lower flying heights and smoother disks. Increased emphasis must therefore be placed on provision of a stable bearing operating between the head and the storage medium which supports the head over the medium at a distance which is smaller than that achievable by the air bearing of the prior art, yet which is mechanically simple and cost effective.

SUMMARY OF THE INVENTION

In view of the above deficiencies of the art, it is an object of the present invention to provide an information storage system with a novel liquid bearing which supports a transducer over a relatively-moving medium. This object, and other purposes and advantages of the present invention are realized in a disk-based information storage system comprising a rigid information storage medium, a transducer for interacting with said information storage medium, a means for applying a force on the transducer directed toward the storage medium, and a liquid bearing acting between the transducer and the storage medium to support the transducer upon the storage medium during relative movement between the transducer and the storage medium.

In this invention, a stable, liquid bearing acting between the transducer and the storage medium includes a high density, chemically stable, and relatively low viscosity liquid and replaces the air bearing used in the prior art.

The unique liquid bearing of this invention provides manifold advantages. The liquid of which the bearing consists damps vibrations of critical components, provides a stiff bearing that supports stable flight for a transducer at flying heights unachievable with an air bearing, floats debris away from the interface between the transducer and the disk, and retards corrosion of the medium. The liquid also makes it possible to choose materials and designs for the critical movable components immersed in the liquid to achieve essentially neutral buoyancy, which further obviates the effects of accelerations.

In an exemplary industrial application of this invention, embodied in a cockpit voice recorder/flight data recorder using the liquid bearing, low-density metallic components or composite parts of a disk drive with essentially the same density as the liquid bearing achieve a configuration that significantly attenuates the effects of vibration and acceleration.

The described cockpit voice recorder/flight data recorder embodiment is but one of a number of applications of the instant invention in which advantage is gained in a high acceleration, high shock environment hostile to the medium-transducer interface. Other applications include, without limitation, laptop computers, typewriters, machine tools, robots, oil well data loggers, and battlefield recorders.

BRIEF DESCRIPTION OF THE DRAWINGS

The novel features of the present invention may be better understood from the accompanying description when taken in conjunction with the accompanying drawings, in which like characters refer to like parts and, in which:

FIG. 5A-5C illustrate enlarged front, bottom plan, and side views, respectively, of the head of FIG. 3;

FIG. 11 is a magnified cutaway view of a vent port in the recorder of FIG. 8;

FIG. 13 illustrates a typical recorder data block format;

FIGS. 14A-14D illustrate details of the synchronization and address mark, block address, audio channel sample and block parity word fields shown in FIG. 13.

DETAILED DESCRIPTION OF A PREFERRED EMBODIMENT

In this description, the terms "transducer" and "head", and "disk", "rigid disk", and "storage medium" are synonymous.

LIQUID BEARING

The present invention provides a liquid bearing acting between the rigid disk and head components of a head-disk assembly (HDA) used in information recording systems of the Winchester type. An exemplary industrial utilization of the instant invention is a cockpit voice recorder/flight data recorder (recorder), described below.

Figure 1:
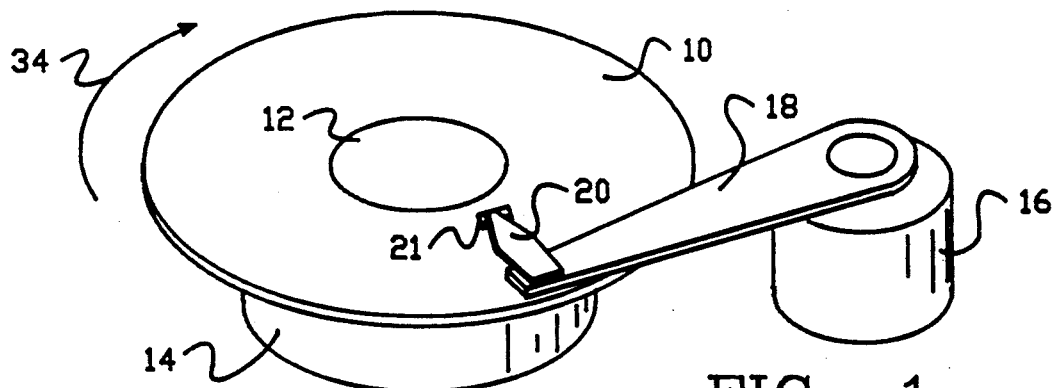
FIG. 1 illustrates a simplified diagram of a typical prior art arrangement of a head-disk assembly.
Figure 2:
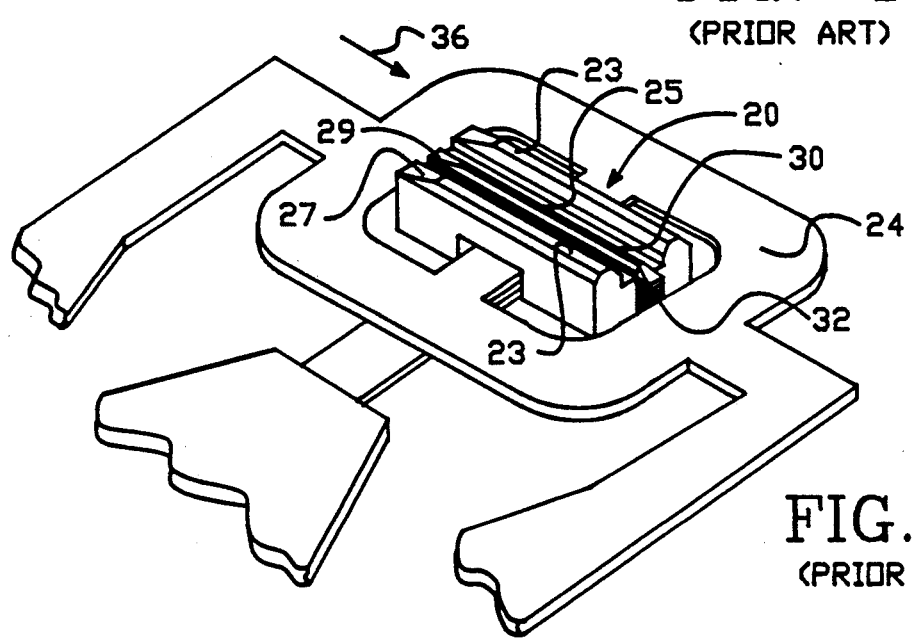
FIG. 2 illustrates an enlarged view of the underside of a typical prior art head which utilizes an air bearing interface between the head and disk.

In the prior art, illustrated in FIGS. 1 and 2, the interface between a rigid disk medium 10 and a transducer 21 is maintained in an assembly including a means for rotating the disk 10, the means including a spindle 12 which fits through a central circular hole in the middle of the disk 10, and a spindle rotator 14. The transducer 21 is normally loaded by application of a pressure or force applied to the transducer 21 and directed toward the disk 10. The force is applied by an assembly including an actuator 16, a swing arm 18, and a gimballed spring suspension mechanism 20. The actuator pivots the swing arm 18 to selectively position the transducer radially with respect to the disk 10. The gimballed spring suspension mechanism 20 loads the transducer 21 against the disk 10 when the disk is stationary. When the disk rotates, an air bearing is generated which counterloads the transducer 21, lifting and maintaining it above the surface of the disk to a distance referred to as the flying height. The spacing between the transducer 21 and the surface of the disk 10 is generally determined by the amount of loading exerted on the transducer 21, by the spring suspension, the aerodynamic design of the transducer 21 and the rotational velocity of the disk. It is to be understood that FIG. 1 is representative of the minimum complement of parts used to establish the operational interface between the transducer 21 and the disk 10. In fact, a head-disk assembly normally makes provision for a plurality of parallely spaced, coaxial disks which rotate on a common spindle together with a ganged array of transducer heads controlled by one or more actuator assemblies.

While the disk rotates, conventional means, not shown, are used to operate the transducer 21 to electromagnetically read signals from, or write signals to, the disk. For this purpose, the transducer includes a wound core with a recording gap. For an understanding of electromagnetic recording, see C. Denis Mee, et al., MAGNETIC RECORDING, McGraw-Hill, 1987.

FIG. 2 illustrates a typical prior art read/write head support structure. In the prior art, the structure in FIG. 2 includes what is commonly referred to as a "slider" 22, and the view is from the disk. The slider 22 is suspended on a gimbal 24, which allows the slider to be parallel to the disk 10 in response to forces applied to the slider in directions normal to the disk 10, while preventing lateral motion and yaw of the slider.

The slider 22 of FIG. 2 includes a pair of elongated rails 23, each with a flat bearing surface. A middle rail 25 is provided, also with a flat surface. The leading edges of the side rails 23 are beveled at 27, as is the leading edge of the center rail at 29. The transducer is mounted on the slider to place the recording gap 30 near the trailing edge of the center rail 25, while the transducer windings 32 are positioned below the recording gap on the trailing edge of the slider assembly beneath an anterior extrusion of the center rail 25. When the disk 10 rotates, a layer of air (the "air bearing") builds up at the interface between the slider of FIG. 2 and the disk 10 The built-up layer of air reverse loads the slider on the flat bearing surfaces of the rails 23, lifting the slider off of, or away from, the disk 10. When the disk achieves its operational rotational velocity, the slider of FIG. 2 is borne on the counter-loading layer of air, which now functions as a bearing in supporting the slider during relative motion between it and the disk 10. When rotation of the disk expires, the flow of air between the slider and the disk ceases, removing the counter-loading force on the slider and permitting it to contact the surface of the disk 10.

FIG. 2 illustrates a typical prior art three-rail slider. The art also encompasses other slider configurations, some of which eliminate the center rail and place the electromagnetic transducer element in one of the laterally spaced slider rails 23.

Figure 3:
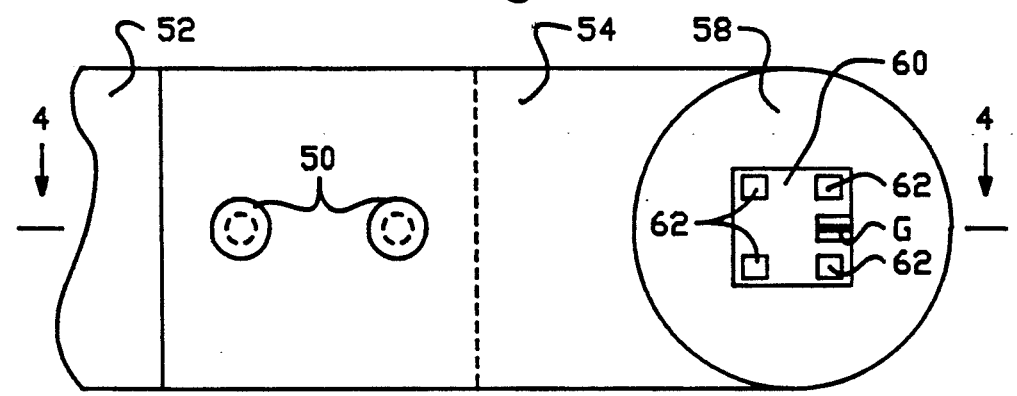
FIG. 3 illustrates an underside view of one embodiment of an improved head used with the present invention.
Figure 4:
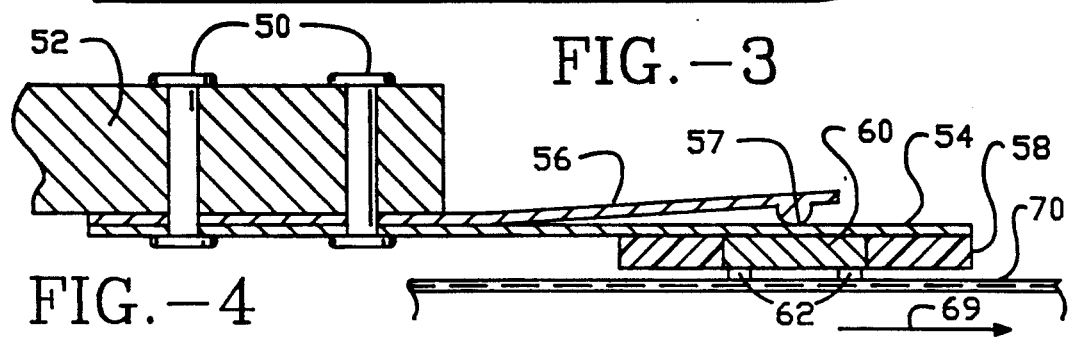
FIG. 4 illustrates a side sectional of the invention.

Reference now to FIGS. 3-5 will provide an understanding of a fundamental aspect of the invention: the liquid bearing. These figures are not to scale, and certain of their features have been exaggerated for clarity.

The invention includes a transducer mounted on a slider block carried at the end of a spring mechanism which is attached to an actuator arm 52 by a pair of through-rivets 50. The rivets attach a flexible mounting strip 54 and a spring strip 56 to the arm in a manner which exerts a spring force through a spring node 57 upon the mounting strip 54, which tends to forge the mounting strip 54 toward the disk 10. A slider mechanism 60 including four slider pads 62 with flat bearing surfaces 64 is mounted at one end of the mounting strip 54, centered underneath the spring node 57. As illustrated in FIG. 5, a pair of bearing pads 62 is carried on each of a pair of elongated lateral ridges 61, which run the length of the slider 60. A central ridge 63, having the height of the lateral ridges 61, transitions to a transducer pad 64 in which the electromagnetic transducer is carried. A recording gap G is formed in the pad 64, which also carries the transducer coils 67. As seen most clearly in the front and side views in FIG. 5, each of the bearing pads 62 has side beveled surfaces 66. In addition, the upper leading edges of the bearing pads 62 are also beveled at 65. As shown in FIGS. 3 and 4, the slider 60 is carried in a material block 58, whose purpose is described below.

In FIG. 4, the disk 10 is rotated in the direction indicated by the arrow 69 to induce relative motion between itself and the slider 60. Carried on the surface of the disk. 10 is a viscous, relatively incompressible, magnetically inert liquid 70 that forms the bearing which supports the slider in a spaced relationship with the upper surface of the disk 10. The slider 60 is loaded with a force or a pressure by the spring node 57, the force or pressure urging the slider in the direction of the disk 10. The viscous liquid 70 is carried on the upper surface of the revolving disk 10. Directly underneath the pads of the slider 60 the liquid 70 has a thickness determined essentially by geometry of the pads, the magnitude and location of the force exerted by the spring 56, the speed of rotation of the disk 10, and the liquid's viscosity. Thus, the spaced relationship exhibited by the slider 60 with respect to the disk 10 is determined by the force or pressure exerted on the slider by the spring 56 in cooperation with the counterforce exerted by the liquid bearing 70 on the slider.

Although not shown, means exist to continuously apply the liquid to the disk during its rotation. For example, a nozzle could be mounted to the slider, or by separate support, to irrigate the disk during rotation. Alternatively, the disk and slider (and associated components) could simply be immersed in the liquid during operation.

Relative to the gas bearing formed by air in the prior art recording systems, the liquid bearing 70 of FIG. 4 is non compressible, thereby providing a very "stiff" bearing which stabilizes the slider with respect to the disk at flying heights beneath those achievable with the prior art air bearing. Indeed, with an empirically selected combination of spring pressure, liquid viscosity, and disk speed, the thickness of the liquid bearing can be less than the mean free path of air molecules, the lower flying height limit of the air bearing in the prior art.

The viscosity of the liquid 70 (relative to air) also substantially increases the damping exhibited by the bearing, when compared to the damping evidenced by the air bearing. This tends to suppress or reduce oscillations of the slider which are perpendicular or parallel to the disk. As is known, perpendicular oscillations can cause the slider to strike the disk; parallel oscillations cause loss of track or phase errors in data being read or recorded.

It is asserted that the inventive combination illustrated in FIG. 4 should not be limited to the particular slider configuration there illustrated. The inventors have also successfully employed the slider configuration illustrated in FIG. 2 in combination with the liquid bearing 70 to achieve a performance similar to that evidenced by the slider of FIGS. 3 and 5.

Figure 6:
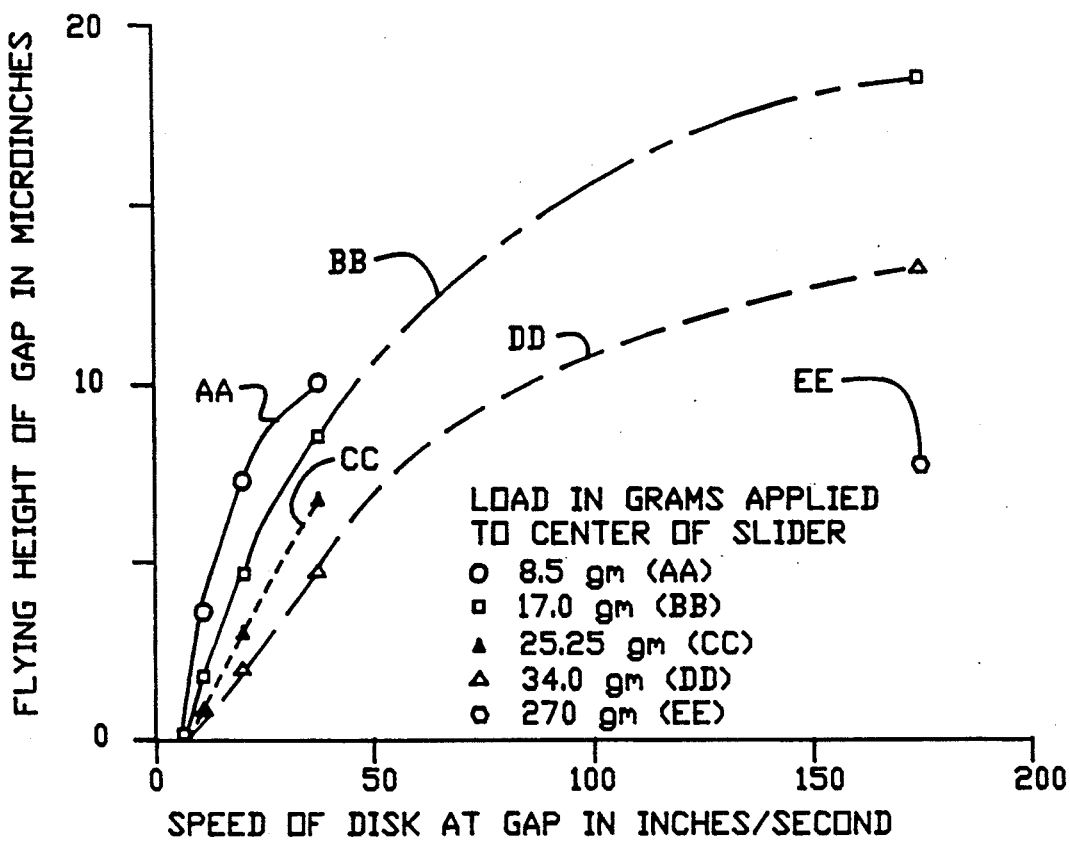
FIGS. 6-7 illustrate flying heights achievable with this invention.
Figure 7:
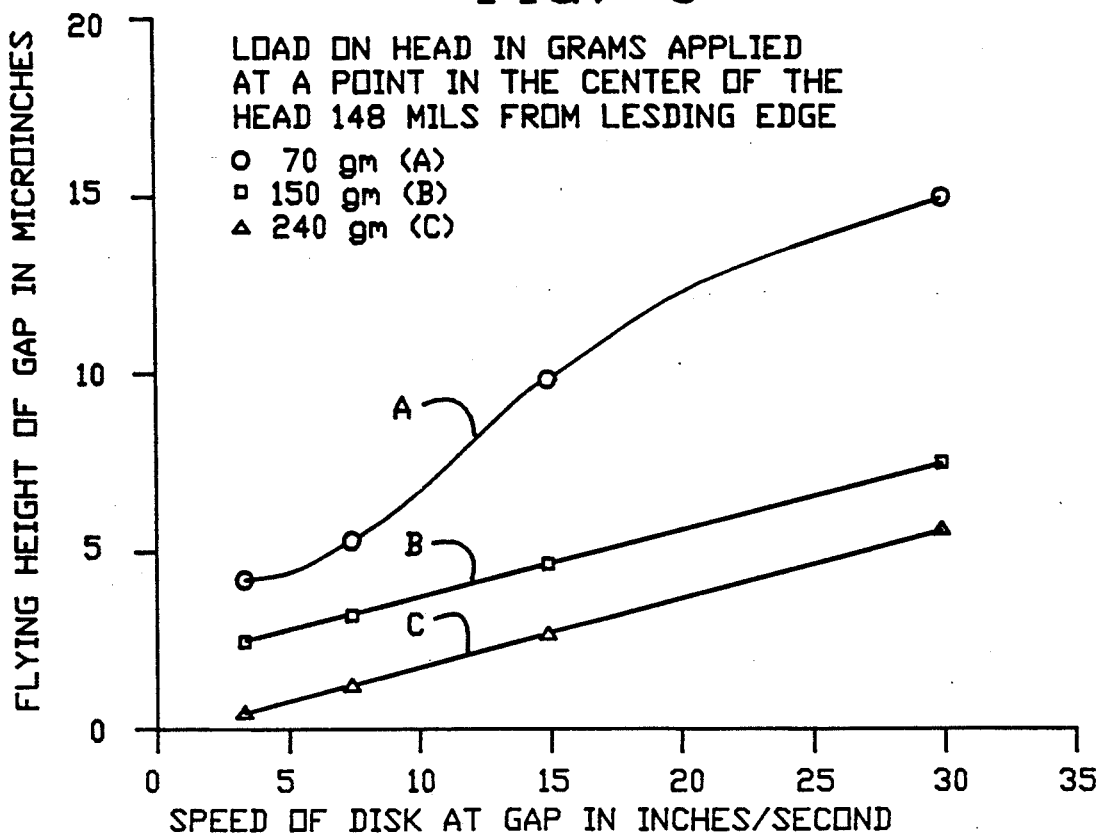

The performances of the inventive combination illustrated in FIG. 4 with the slider of FIGS. 3 and 5 and the slider of FIG. 2 are given in FIGS. 6 and 7, respectively. FIGS. 6 and 7 illustrate the flying height of the read/write heads as a function of speed for various loading forces. The liquid used in both cases was Galden #D02, made by Montefluos of Milan, Italy. According to principles well known in the art, electrical measurements of the voltages generated by the head of FIG. 2 during playback under the various combinations of speed and load illustrated in FIG. 7 were used to infer the relative flying heights of the slider. The absolute flying heights of the slider were then measured by observing interference patterns on the surface of the slider while flying the slider above a glass disk under similar combinations of speed and load. FIG. 7 presents the inventors' best estimate of the flying heights based on a comparison of the electrical and optical measurements. The flying heights illustrated are further corroborated by noting that, as would be expected, they tend to converge on zero microinches as the speed approaches zero.

The relative values of flying heights under conditions of speed and load shown in FIG. 6 were inferred from measurements of reproduce voltage as was done for the slider of FIG. 2. It was noted that at 3.75 inches per second, the flying height did not decrease with increasing loads above approximately 14 grams; this was taken to mean that the slider was essentially in contact with the disk under these conditions. This assumption allowed the relative flying heights to be converted to absolute flying heights shown in FIG. 7. These flying heights are further corroborated by a comparison of reproduce voltages measured for the slider of FIGS. 3 and 5 to those of the slider of FIG. 2 at the flying heights known in FIG. 7, using principles well known in the art.

The slider shown in FIGS. 3 and 5 was pressed toward the disk during these tests by applying the loads shown in FIG. 6 at a point essentially at the center of the slider, as is shown in FIG. 4. The data were taken at a wavelength of 60 microinches, which, in the case of the data taken at 180 ips, means that the frequency was 3 mHz. It will be evident that very low flying heights were observed, some of which were beneath the lower flying height limit of the air bearing.

The slider shown in FIG. 2 was pressed toward the disk during these tests by applying the loads at a point midway between the rails and 0.148 inches back from the leading edge of the 0.160 inch long slider when the slider was operated with a liquid bearing as shown in FIG. 4. The leading edge is the edge of the beveled areas, 27, in FIG. 2 most distant from the recording gap, 30. The same inference can be drawn form FIG. 7 as from FIG. 6: that is, stable flying heights beneath those achievable for an air bearing are enjoyed with the liquid bearing.

INDUSTRIAL APPLICATION: VOICE RECORDER/FLIGHT DATA RECORDER (CVR/FDR)

The invention described above is now presented in a preferred industrial application, embodied in a CVR/FDR (recorder). Most CVR/FDR's available utilize magnetic tapes or metal foils as a medium to record cockpit voice and flight data of interest. As is known, these recorders are fashioned to be rugged, durable units, able to withstand the catastrophic effects of an aircraft crash. This ability enables a recorder to preserve data which might be relevant to analysis of the cause of a crash. Such units are frequently found to be unsatisfactory in terms of reliability, performance, survivability, and cost. This industrial application overcomes these prior art failings by employing a modified Winchester-type head to record information on a rigid magnetic disk that will retain information at a high temperature in a head/disk assembly (HDA) immersed in a liquid which is incompressible and viscous relative to air/gas and which provides the liquid bearing described above at the disk-medium interface and which also enhances the crash survivability of the recorder.

A CVR/FDR is enabled to operate reliably during the normal and the extraordinary conditions for which it is designed by utilizing the novel liquid bearing described above, along with structural features which enable the recorder to withstand disastrous shock and acceleration, and HDA components that are configured to achieve an overall neutral buoyancy effect. During the extraordinary conditions relating to an aircraft accident, the CVR/FDR is capable of retaining data after exposure to a 1100° celsius flame (C) over 50% of its exterior surface for ½ hour, a continuous 400° C. over its entire surface, and acceleration environments up to 1000 Gs. The storage medium is a conventional 5¼" disk consisting of a light metal substrate on which is sputtered a special cobalt alloy that retains its magnetic remanence at temperatures below 420° C.

Figure 8:
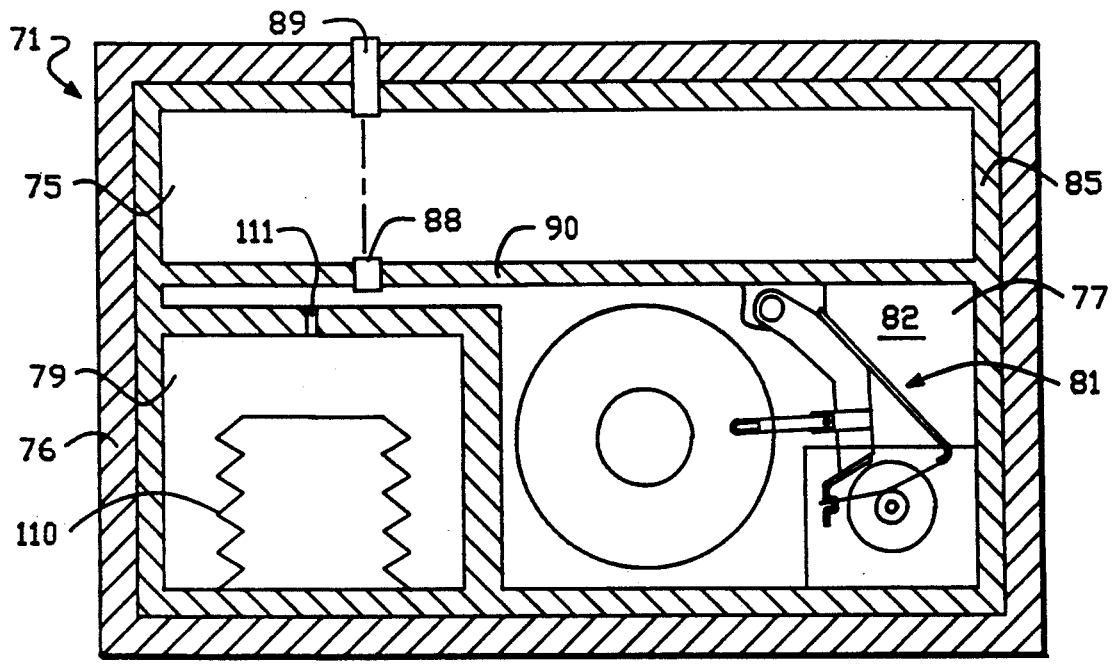
FIG. 8 illustrates a schematic cross section of one embodiment of the present invention in a cockpit voice recorder/flight data recorder.
Figure 9:
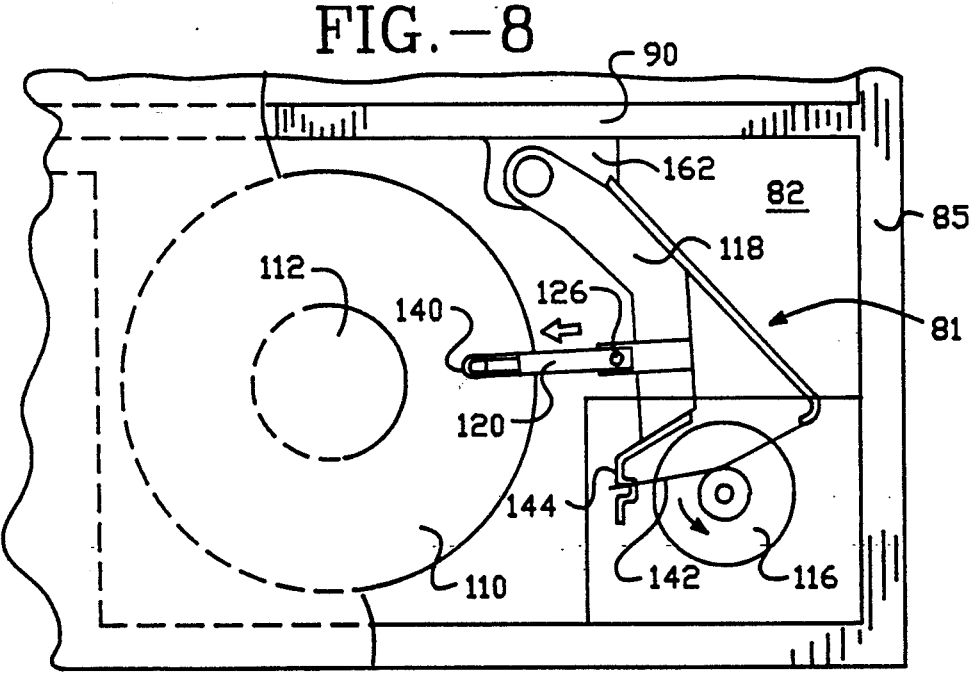
FIG. 9 illustrates a top plan view, partially cut away, showing a typical arrangement of the head-disk assembly of the recorder.
Figure 10:
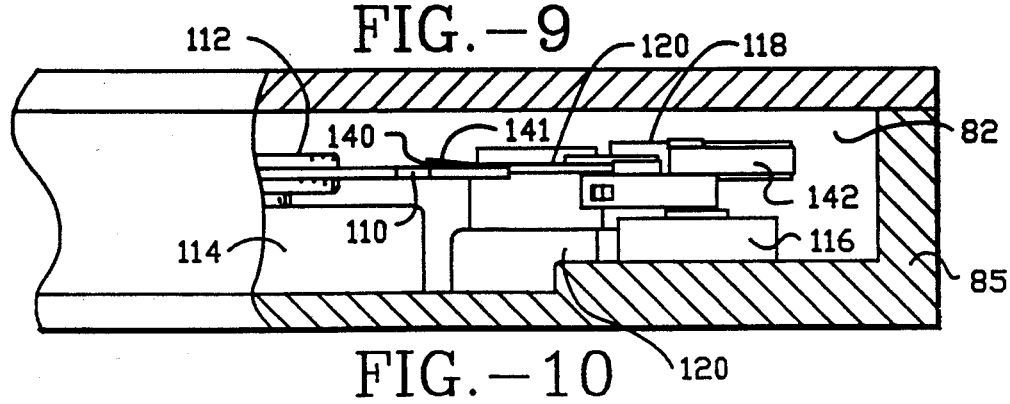
FIG. 10 illustrates a side elevation view, partially cut away, of the head-disk assembly of FIG. 8.

The recorder is illustrated in FIGS. 8-10. The recorder 71 is housed in a monolithic cartridge 85 containing an aqueous chamber 75, a disk chamber 77, and, within the disk chamber, an expansion chamber 79. The disk chamber 77 contains an HDA 81 immersed in a liquid 82 that is substantially incompressible. The liquid 82 is, preferably, identical to the liquid 70 of FIG. 4. An example is the Galden D02 liquid, a liquid fluorocarbon which boils at 175° C. When the liquid 82 entirely fills the disk chamber 77, leaving no gas in the chamber, it is capable of transmitting stress as a monolithic whole, thereby increasing the rigidity of the chamber and reducing the probability of it being penetrated in response to the stress. The aqueous chamber 75 is entirely filled with water. Water is included because it can dissipate a significant amount of heat from the interior of the cartridge by boiling; it has the highest heat of vaporization of any known substance. Thus, the water in the aqueous chamber furnishes significant protection of the HDA against the intense heat which accompanies an aircraft fire. The chambers 75 and 77 are contained within the partitions of a 6-sided cartridge 85 encased by a thermal insulation material 76.

A pair of aligned vents 88 and 89 open, respectively, between the disk chamber and aqueous chamber, and between the aqueous chamber and the external environment bathing the recorder. In FIG. 11, the vent port 88 is illustrated in cross-section, with the understanding that it is essentially identical with the vent port 89. In FIG. 8, the vent port 88 is formed in the upper wall 90 dividing the aqueous and disk chambers and includes an annular body portion 91 having a hollow cylindrical space of relatively large diameter which opens to the aqueous chamber and which terminates in a relatively small diameter hole 92, opening to the disk chamber. The large diameter space has a threaded portion 93 and a non-threaded portion 94. A threaded plug 96 with vent holes 97 opening through the plug is threaded to the portion 93 of the port. A metal stopper 99 having a smaller diameter than the diameter of the cylindrical opening is held in the non-threaded chamber portion 94 against the small diameter port 92 by a spring mechanism 100, such as a Bellville washer, acting between the threaded plug 96 and the stopper 99. A solder seal is provided between the stopper 99 and the bottom of the non-threaded portion 94 of the large diameter opening. The solder forming the seal 101 is selected to melt at a first temperature, preferably 110° C. In the vent port 89, the solder forming the seal between the metal stopper and the small diameter port is selected to melt at a lower temperature than the seal 101. In this embodiment, the second temperature is 95° C.

The vent ports 88 and 89 permit venting of the recorder 71, as follows. Assume that the ambient temperature bathing the recorder elevates. When the elevating external temperature causes the internal temperature of the recorder 71 to exceed 95° C., the solder seal in the vent port 89 melts. The Belville spring exerts force to keep the stopper pressed against the bottom of the non-threaded portion 94. The water in the aqueous chamber expands and exerts a continually increasing pressure against the stopper through, the small diameter hole. Eventually, the pressure exceeds the loading of the spring between the stopper and the plug, forcing the stopper toward the plug. The space between the port and the stopper increases as pressure from the water moves the stopper. As the temperature rises past 100° C., the seal is eventually broken, permitting water vapor in the aqueous chamber to be vented around the stopper and through the vent holes in the threaded plug. The escape of steam dissipates the heat energy flowing into the cartridge until all the water has boiled away. If heating stops before the water boils away completely, the boiling stops and the pressure drops to the point that the spring can again seal the valve. Further cooling causes the solder to solidify, which further improves the seal. On the other hand, if heating continues after the water has boiled away, then the solder in the vent port 88 will melt at 110° C. This will permit expansion of the liquid 82 past the valve and into the aqueous chamber. If heating continues to the boiling of the liquid 82, 175° C. in the case of Galden D02, then the liquid in both chambers will boil and vent until none is left. The hard disk 110 will retain information to at least 400° C.

As the cartridge begins to cool, the pressure inside will begin to drop until the pressure inside the aqueous chamber is the same as the external pressure. Further cooling will cause a reversal of pressure, and contamination from the outside of the cartridge might tend to be pressed past the valve 89 and into, first the aqueous chamber, and then the drive chamber 77. It is unlikely that contamination would reach the inside of the drive chamber because the valve surfaces can be made very flat, and the spring force of the Bellville washers high. Furthermore, reverse pressure tends to press the vent ports 88 and 89 shut, and the surface tension of the solder is very high. A simple baffle could also be provided in the aqueous chamber to keep contamination from the vent port 88. As soon as the interior of the cartridge cools past the melting point of the solder in the vent port 88, the drive chamber is hermetically sealed by the solder/stopper valve. Clearly, this process could be repeated an indefinite number of times, and the vent ports would open and close in a similar way, even after all of the liquids have boiled away. This described procedure permits the recorder to survive an aircraft fire without contamination of the HDA disk, and without loss of data on the disk.

Further describing the structure of the recorder in FIG. 9, the expansion chamber 79 is closed to the disk chamber, save for a small-diameter port 111 opening between the expansion and disk chambers. The port 111 is very small and limits the rate at which liquid can flow from the disk to the expansion chamber. An accumulator 110, which can comprise, for example, a gas bellows, is disposed within the expansion chamber 79.

The maximum temperature that the HDA will experience in normal operation or storage is 70° C. Ideally, the accumulator in the expansion chamber 79 is designed to have virtually zero volume at 110° C., that is, to be completely compressed. The disk chamber 77 and expansion chamber 79 are completely filled with the liquid at a temperature equal to the melting point of the solder in the vent port 88 and at an ambient pressure that completely compresses the accumulator 110. The volume and capacity for expansion of the accumulator must be such that at −55° C., the accumulator will be completely expanded. The spring constant of the accumulator 110 will determine what the pressure will be in the chamber as the temperature varies. This can be increased to a desired value by including, for example, a coiled spring in the gas bellows 110. When the chamber is full, the stopper and Bellville washer are inserted into the vent port 88 with solder in the location described above, and the plug is screwed into the vent port to seat the plug and washer. Next, the cartridge is cooled to approximately 98° C., the water chamber is filled to the desired level with water and the vent port 89 is sealed as above.

With the chamber filled as thus described, the port 111 opening between the disk and expansion chambers permits relatively low frequency changes in the volume of the liquid 82 caused by temperature variations to be brought against the accumulator 110 through the port. However, relatively high-frequency displacement of liquid in the disk chamber as would be caused by shock, jarring, or the heavy blows of an aircraft disaster will not be brought against the accumulator 110. The disk chamber 77 is filled with liquid under conditions of temperature and pressure which pressurize the liquid when the chamber is sealed and brought into its operating environment. This pressurization has two beneficial effects. First, the motion relative to the chamber of any given element of the liquid 82 due to any slight differential compression of the liquid in response to accelerations of the disk chamber will be reduced by the presence of an internal positive pressure. Differential compression of the liquid and associated fluid flow as might be produced by, for example, a sudden, violent acceleration of the disk chamber could exert forces on HDA elements immersed in the liquid. The second beneficial effect, explained in more detail below, is to suppress the tendency of the liquid 82 to exhibit a density gradient in response to an extreme aircrash acceleration. As explained below, the HDA, and its components are designed to have a neutral buoyancy with respect to the liquid 82. If acceleration of the recorder 71 created a density gradient in the liquid 82, the HDA components would no longer be uniformly neutrally buoyant. As a result, undesirable relative displacement could occur between these components.

Other design considerations might result in choosing a solder for the vent port 88 with an even higher melting point than 110° C. In fact, the disk chamber could be welded shut with no provision to vent the liquid 82. The penalty for this would be that the expansion chamber 79 would have to be big enough to accommodate all of the expansion that the liquid would undergo in response to the maximum design temperature, 400° C. In this case, the HDA and disk chamber could be designed so that much of the volume of the chamber would be filled with metal, with very little liquid required to complete the filling. In this case, even a small expansion chamber could accommodate all the expansion that would occur in heating the disk chamber to 400° C. Other considerations might obtain to provide for the expansion of water in the aqueous chamber with temperature or upon freezing. In this case, a volume of gas could be left in the aqueous chamber only, implying that the bulkhead between the aqueous and disk chambers must be rigid enough that the resistance to sudden crushing desired for the disk chambers not be compromised. Alternatively, a separate expansion chamber could be provided in the aqueous chamber.

The last design consideration concerns the selection of the liquid 82. The liquid 82 may be selected from a group of liquids loosely considered as "fluorocarbons". The family of liquids tends to be very stable, non-toxic, and has unusually high density. The simplest example of such a fluid, called a perfluorinated fluid, is made by 3M. The molecules of this fluid consists of a straight chain of carbon atoms, with two fluorine atoms attached to each carbon atom. This family has higher density and lower viscosity than other types of fluorocarbons. The Galden D02, referenced above, is from a more complex family of fluorocarbons generally called "perfluoropolyethers". Perfluoropolyethers are widely used as boundary lubricants in the disk drive industry because of their excellent boundary layer properties.

FIGS. 9 and 10 illustrate the top plan and side elevation views of the head-disk assembly (HDA) 81, as it is typically configured in the disk chamber 77 for recording cockpit and flight data onto a hard disk using conventional magnetic recording techniques as modified by the presence of the novel liquid bearing of the invention. The HDA components include a read/write head on a slider assembly 140, a spring mechanism 141, an actuator arm 118, a suspension arm 120, and a stepper motor assembly 116. The actuator arm 118 is mounted on a support 162 fixed to the wall 90 of the disk chamber 77. A metal band 142 couples the stepper motor 116 to the actuator arm 118. A stop assembly 144 is installed on the actuator arm 118. The HDA 81 further includes a rigid magnetic disk 110 which is rotated by a drive motor 114 on a spindle 112. The actuator arm 118 and suspension arm 120 are connected by suitable connecting pins 126. As shown in FIG. 10, the spring mechanism 141 loads the slider 140 toward the disk 110. When the disk 110 is rotated on the spindle 112, the liquid 82 filling the disk chamber 77 provides the liquid bearing which supports the slider 140 upon the surface of the rotating disk 110 while the transducer carried on the slider records data on the disk. As discussed above, the liquid bearing results from an upward load on the slider 140 generated by pressure in the liquid 82 caused by rotation of the disk 110. It has been asserted that the bearing is very stiff, meaning that the forces perpendicular to the disk 110 and acting on the slider 140 are much greater than the forces felt by the mass of the slider 140 in response to accelerations of the slider resulting from bumping, jarring, vibration, or other shocks or oscillations of the recorder 71. Further, the stiffness and viscosity of the liquid bearing act to dampen and effectively stamp out vibrations of the slider.

In the industrial application in FIGS. 8–10, the HDA components are fabricated of special alloys and materials whose densities match the density of the liquid 82 in the disk chamber, where possible. If it is not possible to use materials with identical specific densities, for example, in the use of high-density ferrite material in the head, the high-density material is bonded to low-density material of sufficient volume to result in near zero buoyancy of the component in the disk chamber liquid 82. Accordingly, none of the HDA components will experience differential forces when the entire recorder is accelerated shocked or jarred. This novel design permits the recorder to be utilized in the high vibration environment of an operating aircraft and to survive the exposure to otherwise catastrophic acceleration forces in the event of an aircraft crash.

Achievement of "perfect" neutral buoyancy of the HDA components might be possible with careful selection of materials which have the same bulk modulus (compressibility) as the liquid 82 filling the disk chamber 77. It would be necessary, of course, to select materials which also have the same coefficient of thermal expansion as the liquid if perfect neutral buoyancy is being maintained over a temperature range of interest. Alternatively, the inventors contemplate placement of a thermal regulator in the disk chamber to reduce the range of temperature variation of the liquid 82.

To approximate the conditions of neutral buoyancy for the critical elements of HDA, three component modifications are implemented in the present invention. First, the average density of each rigid element of the HDA is made equal to the density of the liquid 82. Second, the centers of mass of the separate elements making up any given rigid element are so positioned as to result in the generation of no significant net torques on the element by differences in buoyancy of its parts. Finally, the rigid element is rigid enough to result in no significant distortions of the element when minor differences in buoyancy of its parts react differently to shock and vibration. Rigidity is achieved by rigidly connecting materials of lower density to those of higher density, so that the net density of each element is the same as the liquid 82. Alternative ways of achieving this end for HDA components are now described with reference to Figures already described.

Assume now that the slider disk interface of FIG. 4 illustrates the same interface in the recorder 71 and that the liquid 70 is identical to the liquid 82. As shown in FIGS. 3 and 4, the mounting strip 54 is made of a metallic alloy with density equal to that of the liquid 82. Integral with the mounting strip 54 is a material block 58 in which the slider 60 is seated. The material block is a composite structure in which hollow glass spheres (not shown) are distributed through an epoxy carrier. The density of the epoxy, the net density of the glass spheres, and the packing fraction of the spheres are all selected to ensure that the net density of the material block 58 and the slider 60 exhibit neutral buoyancy when immersed in the liquid 82. Alternatively, the volume of epoxy material in the material block 58 can be reduced if the slider 60 is made of a low density material which would be used in, for example, manufacture of a mini-composite head or a thin film head. The strip 54 is fabricated of a material having a density equal to that of the liquid 82.

Preferably, the spring 56 is of a material or a material composition which exhibits a change in spring constant in response to change in temperature of the liquid 82 so that it can closely compensate for the change in viscosity of the liquid caused by the temperature change. This will ensure that the loading forces on the slider remain in a balance that maintains a uniform flying height. This preserves the integrity of the data recorded.

The net density of disk 110 and spindle 112 may also be made equal to that of the liquid by laminating two high-density disks together with a selected low-density material, such as epoxy or ceramic sponge material. In this manner, a density equal to the liquid 82 can be realized. Alternatively, these components could be made of a material whose density equals that of the liquid 82. Although not shown in FIG. 4, the net density of the strips 54 and 56 and the net density of the arm 52 can be matched to the liquid's density by providing composite structures like that of the slider/block 60 and 58.

Operation

The recorder 71 typically operates as follows. The recorder is capable of recording the last 30 or 60 minutes (or more, depending on whether an HDA with one or more disks is used) of audio from three separate 54 db SNR (signal-to-noise ratio), 5 KHz bandwidth, audio channels (two standard 600 ohm "line-levels" and one preamplified high or low impedance microphone input). In addition, the recorder records flight data information over the same period in the form of several analog and/or digital inputs (the total real time flight data rate 8 kilobits/sec).

Further, the recorder is compatible in form and function with existing units, particularly in its interface signals. A separate interface module for various installations also helps to isolate the basic recording functions from aircraft-specific requirements (see Flight Data Interface below).

CVR/FDR System Components

Figure 12:
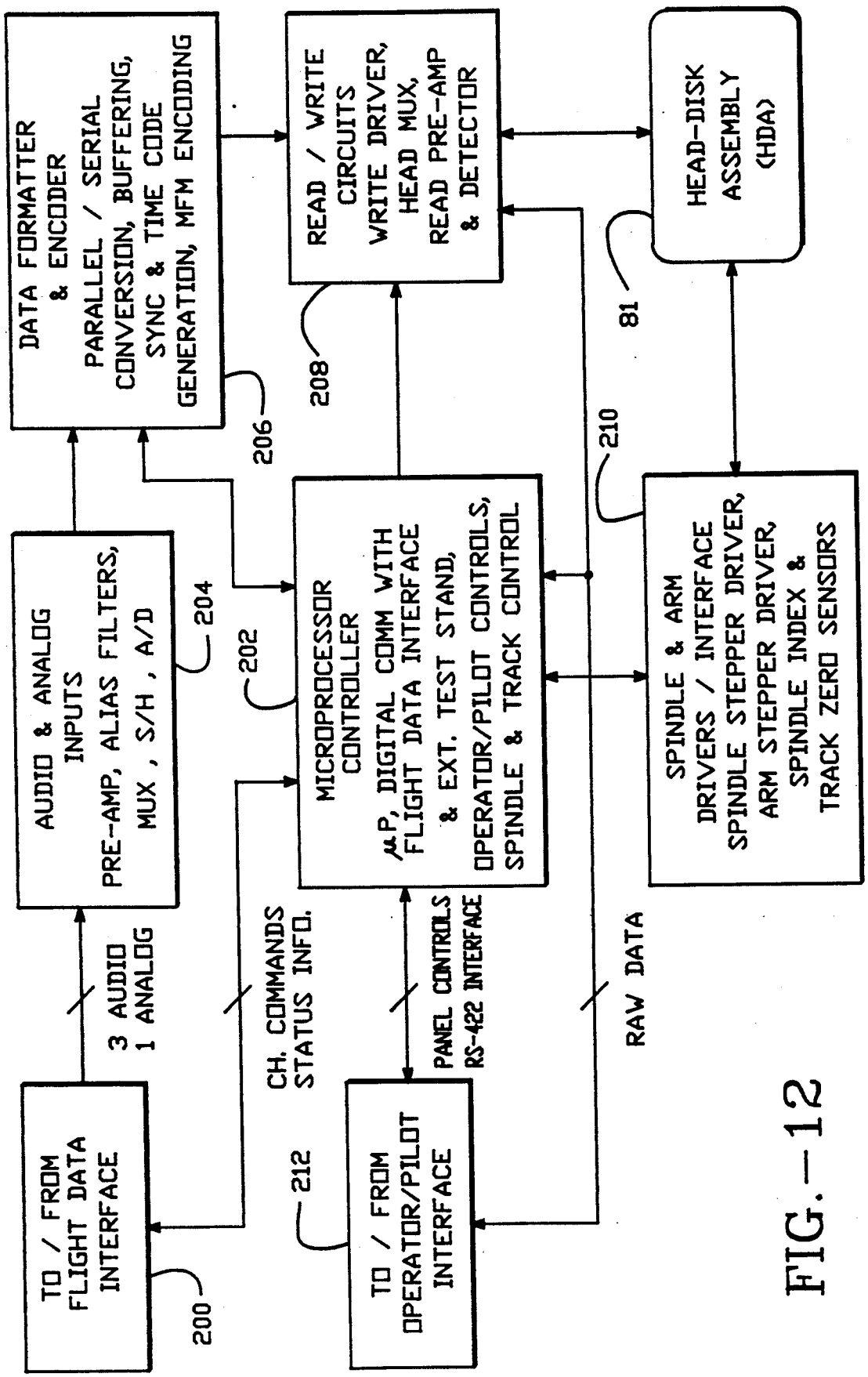
FIG. 12 illustrates a block diagram of the recorder electronic system.

FIG. 12 is a functional block diagram of the electronics associated with the recorder. For clarity, the electronics are not shown in the schematic diagrams of FIG. 8–10. These blocks do not necessarily depict the physical separation of the circuit elements. The entire electronics, excluding the flight data and operator/pilot interfaces and the power supply, typically occupy a single printed circuit board using, for example, surface-mount technology. Further, a set of hermetically sealed feedthroughs (not shown) is used to electrically connect components within the recorder with the outside environment.

The flight data interface (FDI) 200 is an external module that accepts all inputs from the aircraft and, when necessary, converts them to the appropriate signals acceptable to the recorder. A different FDI 200 can be supplied for different aircraft installation requirements.

FIG. 12 shows 3 audio channels being multiplexed in a voice/data channel at 204; in fact, present technology supports multiplexing of any number of voice (audio) channels into the voice/data channel. Excluding the three dedicated audio lines, there is only one other analog signal line. This line is multiplexed in the FDI to accept as many analog signals as a given installation requires. The recorder's microprocessor 202 transmits the command selecting the appropriate analog flight data signal by the FDI multiplexer. All digital flight data are supplied through the FDI directly to the microprocessor for formatting into the flight data bits of the recorded data blocks. The recorder also interfaces with fly-by-wire electronics for recording flight control-surface commands at the FDI 200.

The three audio and one flight data signals arrive through the audio and analog input module (AAIM) 204. Here, the audio signals undergo anti-alias filtering and amplification. These signals and analog flight data are then multiplexed down to one signal line, sampled, and held. The individual samples are then processed by an analog-to-digital converter into 12-bit words. Only the ten most significant bits are used for the audio samples, but all twelve are available for use in measuring analog flight data. This provides for virtually no quantization error in the audio and allows for a larger dynamic range in flight data signals should automatic calibration/correction be performed by the microprocessor.

The data formatter and encoder (DFE) 206 performs all formatting (packing) of the audio samples, flight data, synchronization and time/block-address codes, and error detection and correction parity words. The blocks of formatted data are then encoded into MFM (modified frequency modulation), or other suitable code, and sent to the write drivers for recording onto the disk. Because of the additional information that must be included in the recorded data blocks, the DFE must also supply buffering of the realtime audio and flight data samples.

The read/write circuits 208 take the MFM data stream from the DFE and drive the recording head with the appropriate electrical current. A read preamplifier and detector are included for operational testing and off-loading of data to an external system (not shown). No onboard decoding of the data is provided in the recorder, only recording verification. Switching of the write driver and read preamplifier between the different heads is also accomplished by the read/write circuits.

The hub 112 and actuator arm 118 are both stepper motor driven. The drivers for these motors are in the spindle and arm drivers/interface SADI 210 with the speed and step commands coming from the recorder's microprocessor 202. Feedback signals such as the spindle index pulse and track-zero index are supplied to the microprocessor by the SADI. For ease of system test and application flexibility, independent spindle and arm motor/drivers are used, including an arm motor with sub-track stepping capability.

The microprocessor 202 ties together all other parts of the electronics. At the "front-end," it coordinates the sequencing of the various flight data sources through commands to the FDI 200 and also assembles the flight data into bytes for inclusion into the recorded data block. By using the microprocessor 202 for this function instead of hard-wired logic, significant reduction in control hardware and increase in flexibility are realized, especially when the same microprocessor is used for other functions as well.

At the "disk-end" of the system the microprocessor 202 sets and monitors both the disk's spindle motor and the head's positioning arm drives. By direct control of these functions the tracking of the head can be made to either approximate a continuous spiral or form concentric tracks which may be used for ancillary data that is to be preserved for longer than the flight data recording time.

Other functions performed by the microprocessor 202 include date and time keeping, overall system monitoring, and interfacing to an operator/pilot control panel 212. Through this panel 212, pilots and/or maintenance personnel will be able to set and check the recorder's clock/calendar, initiate self check operations, or connect the recorder to an external system for remote testing and/or transfer of recorded data.

Since the configuration of the aircraft interface is installation dependent, this description will not include the FDI circuits. The maximum raw data rate that can be recorded as "flight data," as opposed to audio data, is 8 kilobits/second This can include any combination of digitized analog signals or digital signals.

The description of the HDA 81 and the SADI 210 that follows below corresponds to the flow of data in the recorder.

Input Processing

Data to be recorded is supplied through five possible sources. There are four multiplexed bipolar analog inputs and one binary digital input. The digital input is applied directly to the microprocessor controller 202 in the form of one or more 8-bit memory-mapped I/O registers in the FDI 200.

Three of the four analog inputs are AC-coupled and low-passed through 5 KHz anti-aliasing filters. Two of these input signals accept standard 600 ohm "line" levels (max. +10 dBmW) and one input signal is preamplified to accept a microphone level.

The fourth analog input is DC-coupled and not filtered. All four input signals have an input impedance greater than ten kilo-Ohms. The fourth input is used for digitizing analog flight data nd can accept levels up to approximately +/−3.0 volts DC. Amplification and/or attenuation may be supplied by the FDI 100 where needed.

All four analog inputs are continuously scanned at a rate of 16 kilosamples/second each. The aggregate analog-to-digital (A/D) conversion rate is 64 KHz with each sample being a 12 bit, signed binary quantity. This sampling format requires a conversion time (including all setup and settling times) of about 15 microseconds. Since a successive-approximation type of converter is used, the input to the converter must not vary during each conversion. A fast sample-and-hold is thus placed between the input multiplexer and the A/D converter.

The data derived from the first three analog inputs (the audio channels) are truncated to the ten most-significant-bits and passed directly to the DFE 206. Selected data samples derived from the fourth analog input (the analog flight data) are passed to the microprocessor controller 202 for packing into the flight data words of the recorded data blocks. Not all samples from the fourth analog input channel are used since the flight data rate is so much less than the audio rate. The multiplexer, sample-hold, and A/D circuits are all clocked at a rate to support the digitizing of the audio and the flight data input is digitized at the same rate for simplicity of design.

Data Blocking and Recording

As stated above, the 10-bit audio samples are sent to L the DFE 206 where they are buffered and gated into a 512 kilobit/second serial bit stream for recording onto the disk. The serial data is grouped into blocks of 1024 bits each (see the recorder Data Block Format in FIG. 13). Each block contains 96 audio samples (totaling 960 bits) and a 16-bit flight data word which is composed for each block by the microprocessor.

In addition, the DFE adds a 12-bit synchronization-/address mark, a 20-bit block address, and a 16-bit block parity word. These additional bits are used for start-of-block detection, time synchronization, and error detection/correction on playback.

FIG. 14A illustrates the synchronization and address mark data block format. A unique, invalid MFM pattern for synchronization of the data separator and block beginning is utilized. Because the transitions define the MFM code, the polarity shown may be reversed. The synchronization pattern is created by sending 100001010000 (where the rightmost is the least significant bit and is sent first) and by deleting the transition that normally would occur in bit cell 9. The valid MFM transitions are shown by the dashed lines.

FIG. 14B illustrates the block address data format. The block address is a binary quantity which represents the number of 1/500's of a second past the half-hour. The actual date and time is encoded by the microprocessor in the flight data over a longer interval.

FIG. 14C illustrates the audio channel sample data format. The sample is a signed-binary quantity representing the instantaneous value of one of the three audio channels. The sampling rate of the audio is lower than the writing clock rate. Thus, buffering of the audio data is required.

FIG. 14D illustrates the block parity word data format. The parity word is created using the CCITT-16 standard. To increase the detection and correction of burst errors, the parity words may be interleaved over several blocks with no increase in overhead.

The formatted serial data is encoded into MFM form and is supplied to the record head driver. Since there are at least two and possibly four or more record heads (depending on disk/recording time configurations), the head selection is best controlled by the microprocessor. Finally, with the provision of a simple read preamplifier/detector, the microprocessor could initiate self-check procedures to insure that recording is taking place.

Spindle and Arm Position Control

The control of spindle motor stepping and head actuator arm position is also to be performed by the microprocessor 202. If a step size one-tenth or less of the track spacing is used for the head positioner, then either spiral or concentric track layout can be supported, or both. Further, through ROM look-up tables, a low overhead means of constant head-to-disk speed control (i.e., constant wavelength recording) and complex interleaved spiral tracks can be provided. By providing a single concentric data track, outside the normal voice/data recording area, startup and/or some long-term flight data storage may be provided.

Operator/Pilot Communication

To allow manual initiation of recorder self checks, setting the unit's internal clock, and off-loading data by maintenance personnel, a small interface panel is provided and controlled by the microprocessor 202.

Further Features

Figure 15:
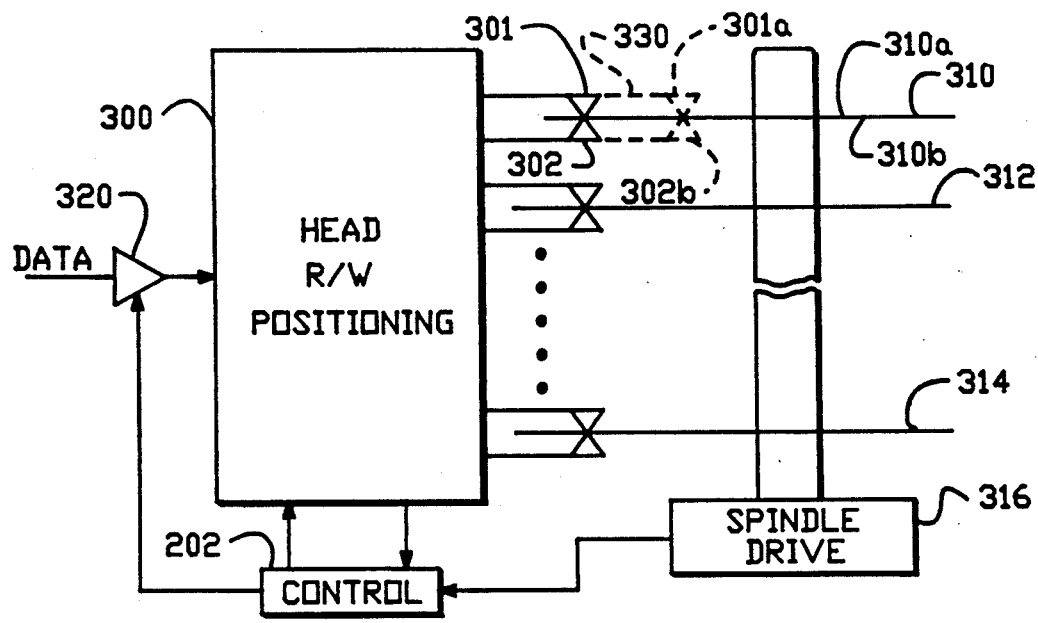
FIGS. 15-17 illustrate various recorder features.

FIG. 15 illustrates a continuous recording feature of the recorder illustrated in FIGS. 8–10. Although the HDA of FIGS. 8–10 implies a single disk, nothing is intended to limit the HDA of the recorder from including a ganged head assembly which interfaces with a multiple disk drive. In FIG. 15, the basic elements of such an assembly include a head assembly 300, which has read/write circuits, drivers and multiplexers all appropriate for driving a plurality of oppositely-directed head pairs, such as 301 and 302. A plurality of disks are indicated by 310, 312, and 314, all attached to be rotated by a single spindle drive assembly 316. Positioning of the heads with respect to the disks is performed by control microprocessor 202. The control microprocessor also receives information on from the spindle drive circuitry relative to rotational position. The control microprocessor 202 also controls an external data multiplexer 320 which provides one or more channels of multiplexer data to the head drive circuitry 300. As is known, recorders in the art are provided for recording the last ½ hour of cockpit voice and aircraft control information, usually in the form of, for example, separate audio and data channels. Continuous recording in the prior art is provided, for example, by an endless tape having the capacity to record ½ hour or more of multichannel audio data. The overwriting of old data provides for the last ½ hour, as required. A "continuous recording" effect can be duplicated on the hard disks 310, 312, and 314 of FIG. 15 in the following manner. A first single channel write head can write to the top surface 310a at the disk 310 while continuously spiraling or stepping in on top surface. Assume that the recording time on the top surface at the data rate of the multiplexed data is 15 minutes. During this time, the head 301 moves from its position indicated by the solid outline at FIG. 15 to its position indicated by the dashed outline 301a. At this time, the multiplexed data channel is switched to the lower head 302 which has been moved in parallel with the head 301 to position 302b. The head 302 is put in write mode. The head drive now moves the lower head 302 from position 302b to the position indicated by the solid outline of 302 while writing the multiplexed data stream onto the surface 310b. Assuming that this recording time is 15 minutes, it will be appreciated that a total of ½ hour has been written onto the top and bottom surfaces 310a and 310b of the disk 310 by the time the lower head reaches the edge of the disk. Now, the data stream is switched back to the top head 301 with the head being moved from left to right toward position 301a, overwriting the previously written data. In this manner, an "endless belt" recording procedure, indicated fancifully by the dotted line 330, is provided, which records the last ½ hour of flight data as required. This process may be continued indefinitely by overwriting the old data on a respective side of the disk 310 with its respective head, or by using a write head that employs a leading-erase head structure. Thus, continuous recording results with the last ½ hour of flight data retained. By adding additional disks and selecting write heads sequentially, recording storage can be increased in ½ hour, or other, multiples depending upon the capacity of a disk.

Figure 16:
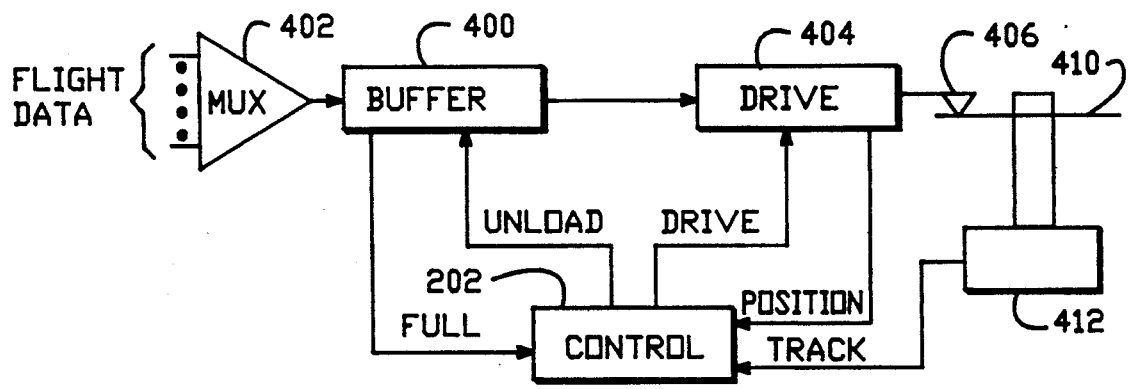

Refer now to FIG. 16 for an understanding of another aspect of the industrial application of the invention. In FIG. 16, a buffer 400 receives all of the multiplexed flight data through a multiplexer 402. When it contains a block of data, the buffer 400 provides an information stream to a write head drive 404, which operates the write head 406 to enter information onto a hard disk rotated by a spindle and spindle drive assembly 412. A control microprocessor 414 has connections to the buffer 400, the head drive 404, and the spindle drive 412. The configuration of FIG. 16 takes account of the fact that more than the last ½ hour of flight data information recorded in the multiplexed channel with audio data might be desired. In some applications it might be desirable, for example, to preserve longer periods of flight data, such as 24 hours. This can be accomplished by dedicating one surface of the disk 410 for flight data recording. Since one revolution of the disk 410 can contain many tens of thousands of bits of information, but the flight data are typically generated at a relatively low rate, the flight data is written, in FIG. 16, onto the disk 410 in bursts of one revolution, or less, of the disk. The flight data are buffered in the buffer 400 until a suitable burst length is accumulated in the buffer for recording. By keeping track in the control microprocessor 202 of the position of the arm which positions the head 406 with respect to the disk 410 (POSITION) and the disk revolution number (TRACK), the control processor 202 enters blocks of data to fill the flight data disk surface on the disk 410. The blocks are suitably labelled to allow ordering the sequence on playback. The control processor 202, of course, waits until buffer 400 contains one block of date, symbolized by the FULL signal available from the buffer 400, at which time it provides a signal UNLOAD, transferring the buffered data from the buffer 400 through the drive 404 onto the disk 410 through the head 406. Generated in the control microprocessor 202 is an accurate map of the information surface of the disk 410 which is translatable into a mapping of the data buffered onto the disk 410 and is a source of the block labelling.

Figure 17:
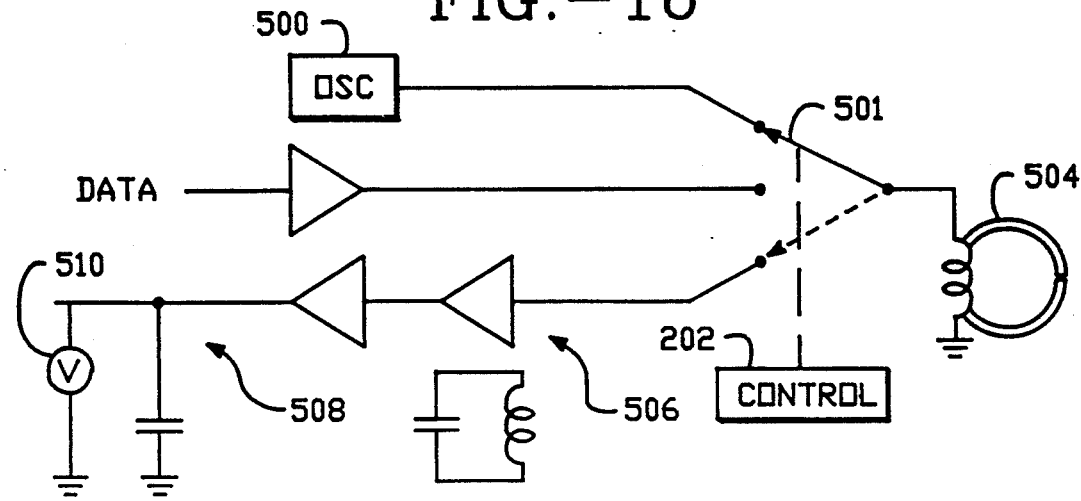

Last, with reference to FIG. 17, it is desirable to be able to verify that the recording function of the recorder is operable prior to a flight. This is accomplished in FIG. 17 by recording a fixed tone available from an oscillator 500 through a single-arm, three-contact switch, 501, whose position is set by a control microprocessor 202. The fixed tone corresponds to a short wavelength on the surface of the disk being recorded through the recording head 504. As is known, short wavelength signals are the most difficult to record on a disk and provide a good indication of the alignment of the head with respect to the disk. The fixed tone is recorded for several revolutions of the disk by operating the head 504 as a write head. After these several revolutions, the head arm (not shown) connected to the head 504 steps the head back to where the tone recording began, and the switch 501 is set to feed a simple tuned amplifier 506, while the head 504 is operated as a read head. The output of the head 504 is fed to the tuned amplifier 506 and the output of the amplifier 506 is rectified in rectifier 508. The output of the rectifier 508 is fed to a volt meter, or other visual indicator, to provide a visual indication of the measurement of the signal read from the tracks on which the fixed tone was recorded. Of course, positive visual output from the indicator 510 gives a reliable indication of correct operation of the recording head 504.

The previous description of the preferred embodiment is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein, but is to be accorded the widest scope consistent with the principles and novel features disclosed herein.

Although this description assumes that the recording process is electromagnetic, it should not inhibit the application of this invention to the optical, electro-optical, and magneto-optical recording arts where rigid disks are used with spaced-apart transducers to receive, store, and surrender information. Indeed, application of this invention in optical recording would provide the described advantages of shock insensitivity and damping through the use of neutral buouyancy with a viscous liquid and also the added advantage of increasing optical recording density with selection of a transmissive liquid which would reduce the wavelength limitation on minimum spot size by an amount corresponding to the index of refraction of the liquid.

What is claimed is:

1. An information storage system, comprising:
   a storage medium, said storage medium being relatively rigid;
   means for rotating said storage medium;
   transducer means positioned in a spaced relationship with said storage medium in response to movement of said storage medium for transferring information for storage on said storage medium and to receive stored information from said storage medium;
   loading means for exerting a positioning force on said transducer means, said loading force being directed toward said storage medium; and
   a liquid bearing provided between and in contact with said storage medium and said transducer means and cooperating with said loading means for supporting said transducer means in said spaced relationship at a distance of less than about 10 micro inches during said movement of said storage medium, said loading means maintaining said transducer means in contact with said liquid bearing.

2. The information storage system of claim 1, wherein said transducer means includes a slider with a plurality of load-bearing surfaces.

3. The information storage system of claim 1, wherein said transducer means has a composite density and said liquid bearing has a specific density substantially equal to said composite density.

4. The information storage system of claim 3, wherein said transducer means is immersed in a liquid including said liquid bearing.

5. The information storage system of claim 1, further including a positioner means for adjusting the relative position of said transducer means with respect to said storage medium in order to locate said transducer means at different portions of said storage medium.

6. The information storage system of claim 5, wherein said positioner means comprises a plurality of movable components having a composite density and said liquid bearing having a specific density substantially equal to said composite density.

7. The information storage system of claim 6, wherein said transducer means is immersed in a liquid including said liquid bearing.

8. An information recording system, comprising:
a storage medium;
transducer means positioned in a spaced relationship with said storage medium or transferring information for storage on said storage medium and to receive stored information from said storage medium;
loading means for exerting a positioning force on said transducer means directed toward said storage medium; and
spacing means, including a liquid extending between and remaining in contact with said storage medium and said transducer means and cooperating with said positioning means, for maintaining said transducer means in said spaced relationship at a distance of between about 6 and 1 micro inches from said storage medium.

9. An information recording system, comprising:
a storage medium, said storage medium being relatively rigid;
means for rotating said storage medium;
transducer means, provided in a spaced relationship with said storage medium for transferring information for storage on said storage medium and receiving stored information from said storage medium;
positioning means for loading said transducer means with a force directed toward said storage medium; and
a liquid damping material provided in contact with and extending between said storage medium and said transducer means for suppressing mechanical oscillations of said transducer means with respect to said storage medium, said liquid dampening material having a thickness not exceeding about 6 micro inches as measured between said transducer means and said storage medium.

10. An information storage system, comprising:
a storage medium;
transducer means positioned in a spaced relationship with said storage medium;
loading means for exerting a positioning force on said transducer means, said positioning force being directed to said medium; and
liquid means provided between said transducer means and said storage medium for supporting said transducer in said spaced relationship at a distance not exceeding about 6 micro inches while suppressing mechanical oscillations of said transducer with respect to said storage medium, said liquid means including a liquid extending between said transducer means and said storage medium.

11. An information storage system, comprising:
a storage medium, said storage medium being relatively rigid;
transducer means, supported in a spaced relationship with said storage medium in response to relative movement between said transducer means and said storage medium, for providing information for storage on said storage medium and receiving information stored on said storage medium;
means for inducing relative movement between said storage medium and said transducer means;
loading means for loading said transducer means against said storage medium; and
a liquid provided between and contacting said transducer means and said storage means and cooperating with said loading means to establish a liquid bearing supporting said transducer means in a closely spaced, information transfer relationship with said storage medium at a distance of less than about 6 micro inches in response to relative movement between said transducer means and said storage medium, said loading means maintaining said transducer means in contact with said liquid bearing and said liquid bearing in contact with said storage medium during relative movement between said transducer means and said storage medium.

12. An information processing system, comprising:
a storage medium for recording information signals;
transducer means closely spaced from said storage medium for transducing information signals to be stored on and read out from said storage medium;
load means for providing a load force to said transducer means, said force being directed toward said storage medium; and
a liquid disposed between and in contact with said storage medium and said transducer means for providing a hydrodynamic force opposing said load force so that said transducer means is supported over said storage medium in a closely spaced relationship at a distance of less than about 6 micro inches.

13. An information storage system, comprising:
a storage medium, said storage medium being relatively rigid;
means for rotating said storage medium;
transducer means, supported in a closely spaced relationship with said storage medium in response to movement of said medium, for transducing information signals for storage on and receipt from said storage medium;
loading means for exerting loading force on said transducer means, said loading force being directed toward said storage medium; and
a liquid bearing provided between and contacting said storage medium and said transducer means and cooperating with said loading means for supporting said transducer means in a closely spaced flying relationship with said storage means at a distance of less than about 6 micro inches.

14. The information storage system of claim 13, wherein the storage medium comprises a disk of the Winchester type and the liquid bearing supports transducer means in a closely space relationship of less than 6 micro inches.

15. The information storage system of claim 13, wherein the transducer includes a slider having four pads, each pad for contacting the liquid bearing.

16. The information storage system of claim 15, wherein said liquid bearing supports said slider in a closely spaced relationship with said storage means of less than 6 micro inches.

17. The information storage system of claim 15, in which each of the 4 pads includes a leading edge, the leading edge being beveled.

18. The information storage system of claim 13 further including a hermetically sealed enclosure containing said storage medium, said transducer means, said loading means, and said liquid bearing.

19. The information storage system of claim 13, wherein said liquid bearing comprises a liquid fluorocarbon.

20. An information recording system, comprising:
a storage medium;
means for rotating said storage medium at an operational rotational velocity;
transducer means for providing information for storage on said storage medium and for receiving stored information from said storage medium;
positioning means for loading said transducer means with a force directed toward said storage medium; and
liquid damping means, including a liquid extending between said storage medium and said transducer means, for suppressing mechanical oscillations of said transducer means with respect to said storage medium while said transducer means is supported in a closely spaced relationship with respect to said storage medium at a distance of less than about 6 micro inches and said storage medium is rotated at said operational rotational velocity.

21. An information recording system, comprising:
a storage medium;
transducer means positioned in a closely spaced relationship with said storage medium for exchanging information with said storage medium;
loading means for exerting a positioning force on said transducer means, said positioning force being directed toward said storage medium;
a liquid provided between and in contact with said transducer means and said storage medium; and
means for rotating said storage medium within a first rotational velocity range characterized by sliding friction between said transducer means and said storage medium and a second rotational velocity range characterized by the presence of a liquid bearing extending between said transducer means and said storage medium, wherein said liquid bearing supports said transducer means in a closely spaced relationship with said storage medium while suppressing mechanical oscillation of said transducer with respect to said storage medium, said closely spaced relationship being at a distance of less than about 6 micro inches.

22. An information storage system, comprising:
a rotatable storage medium;
means for rotating said rotatable storage medium;
a transducer, flexibly positionable for motion toward and away from said rotatable storage medium, for transferring information for storage on said rotatable storage medium and for retrieval from said rotatable storage medium;
loading means for exerting a positioning force on said transducer directed towards said rotatable storage medium;
liquid means, including a liquid contacting said rotatable storage medium and said transducer, for urging said rotatable storage medium and said transducer into a spaced relation upon rotation of said rotatable storage medium; and
said loading means having a selected magnitude and point of application, and said liquid having a selected viscosity for maintaining said transducer and said storage medium at a selected spacing of not more than about 3 micro inches at a selected storage medium operational rotational velocity.

23. The information storage system of claim 22 wherein said transducer has a composite density and said liquid has a specific density substantially equal to said composite density.

24. A method for improving the transfer of information to and from an information storage system comprising the steps of:
providing a rotatable storage medium adapted for storing information thereon;
rotating said rotatable storage medium at an operational rotational velocity;
providing a transducer flexibly positionable for motion toward and away from said rotatable storage medium for inputting information for storage on said storage medium and for outputting stored information from said rotatable storage medium;
providing loading means for exerting a positioning force on said transducer directed towards said rotatable storage medium;
providing a liquid for urging said rotatable storage medium and said transducer into a spaced relation upon rotation of said rotatable storage medium; and
selecting the magnitude and point of application of said positioning force by loading means against said transducer, and the viscosity of said liquid for maintaining said transducer and said rotatable storage medium at a selected spacing at said operational rotational velocity.

* * * * *

UNITED STATES PATENT AND TRADEMARK OFFICE
CERTIFICATE OF CORRECTION

PATENT NO. : 5,193,046

DATED : March 9, 1993

INVENTOR(S) : Morehouse, et al.

It is certified that error appears in the above-identified patent and that said Letters Patent is hereby corrected as shown below:

Column 5, line 6; after "the disk 10" insert therefor -- . --;

Column 5, line 33; after "which tends to" delete "forge" and insert therefor -- force --;

Column 12, line 1; after "the", delete "average" and insert therefor -- *average* --;

Column 15, line 33; delete "L";

Column 15, line 46; delete "block";

Column 16, line 48; delete "on";

Column 16, line 49; after "circuitry", insert therefor -- 316 --;

Column 18, line 6; after "switch", delete ",";

UNITED STATES PATENT AND TRADEMARK OFFICE
CERTIFICATE OF CORRECTION

PATENT NO. : 5,193,046

DATED : March 9, 1993

INVENTOR(S) : Morehouse, et al.

It is certified that error appears in the above-identified patent and that said Letters Patent is hereby corrected as shown below:

Column 18, line 58; after "means"; delete "positioned" and insert therefor -- supported --;

Column 18, line 63; after "exerting a", delete "positioning" and insert therefor -- loading --;

Column 19, line 32; after "medium", delete "or" and insert therefor --for --;

Signed and Sealed this

Twenty-fifth Day of January, 1994

Attest:

*Attesting Officer*

BRUCE LEHMAN

*Commissioner of Patents and Trademarks*